US010975240B2

(12) United States Patent
Yoshizato et al.

(10) Patent No.: US 10,975,240 B2
(45) Date of Patent: Apr. 13, 2021

(54) METHOD FOR PRODUCING ANTIOXIDANT AND METHOD FOR PRODUCING ELASTIC POLYURETHANE FIBER

(71) Applicant: SANKO CO., LTD., Fukuoka (JP)

(72) Inventors: Akihiko Yoshizato, Moriyama (JP); Hiroyuki Tano, Omihachiman (JP)

(73) Assignee: SANKO CO., LTD., Fukuoka (JP)

( * ) Notice: Subject to any disclaimer, the term of this patent is extended or adjusted under 35 U.S.C. 154(b) by 0 days.

(21) Appl. No.: 16/344,515

(22) PCT Filed: Oct. 10, 2017

(86) PCT No.: PCT/JP2017/036651
§ 371 (c)(1),
(2) Date: Apr. 24, 2019

(87) PCT Pub. No.: WO2018/092469
PCT Pub. Date: May 24, 2018

(65) Prior Publication Data
US 2019/0249005 A1    Aug. 15, 2019

(30) Foreign Application Priority Data

Nov. 15, 2016  (JP) .............................. JP2016-222292

(51) Int. Cl.
| | |
|---|---|
| *C08G 18/10* | (2006.01) |
| *C08G 18/32* | (2006.01) |
| *C08G 18/48* | (2006.01) |
| *C08G 18/76* | (2006.01) |
| *C08K 5/13* | (2006.01) |
| *C08L 75/04* | (2006.01) |
| *D01F 6/70* | (2006.01) |
| *D01F 1/10* | (2006.01) |

(52) U.S. Cl.
CPC .............. *C08L 75/04* (2013.01); *C08G 18/10* (2013.01); *C08G 18/3215* (2013.01); *C08G 18/4854* (2013.01); *C08G 18/76* (2013.01); *C08G 18/7671* (2013.01); *C08K 5/13* (2013.01); *D01F 1/10* (2013.01); *D01F 6/70* (2013.01); *C08L 2203/12* (2013.01); *D10B 2501/02* (2013.01); *D10B 2501/04* (2013.01); *D10B 2509/026* (2013.01)

(58) Field of Classification Search
CPC ...... C08G 18/10; C08G 18/3215; C08K 5/13; C08L 75/04; C08L 2203/12
See application file for complete search history.

(56) References Cited

U.S. PATENT DOCUMENTS

| | | | |
|---|---|---|---|
| 4,396,053 A | 8/1983 | Davis et al. | |
| 2009/0061716 A1* | 3/2009 | Tanaka | D01F 1/07 442/302 |
| 2019/0196331 A1* | 6/2019 | Maruyama | G03F 7/0757 |

FOREIGN PATENT DOCUMENTS

| | | |
|---|---|---|
| CA | 369696 A | 6/1975 |
| CA | 2143168 A1 | 8/1995 |
| JP | 57-185374 A | 11/1982 |
| JP | S1-47749 A | 3/1986 |
| JP | S1-47819 A | 3/1986 |
| JP | 62-43480 B2 | 2/1987 |
| JP | 63-58851 B2 | 3/1988 |
| JP | 1-271410 A | 10/1989 |
| JP | 5-24246 B2 | 2/1993 |
| JP | 7-258463 A | 10/1995 |
| JP | 2007-239157 A | 9/2007 |
| KR | 10-2005-0109702 A | 11/2005 |

OTHER PUBLICATIONS

International Search Report for Application No. PCT/JP2017/036651, dated Jan. 16, 2018, 4 pages.
Korean Notice of Allowance for Application No. 10-2019-7013037, dated Nov. 28, 2019, 4 pages.

* cited by examiner

*Primary Examiner* — Melissa A Rioja
(74) *Attorney, Agent, or Firm* — McCarter & English, LLP; David R. Burns; Wei Song

(57) ABSTRACT

The antioxidant according to the present invention contains a polyurethane compound represented by the following formula (1):

$$H \text{---} (OX^1(OH)_{k-2}O \text{---} CONHR^1NHCO \text{---} (OY^1O \text{---} CONHR^1NHCO)_m)_n \text{---} OX^1(OH)_{k-1} \tag{1}$$

(wherein $Y^1$ is a residue of a diol, and plural $Y^1$s may be the same or different, $R^1$ is a residue of an aromatic diisocyanate, and plural $R^1$s may be the same or different, $X^1$ is a residue of a hindered phenol compound having at least k hindered phenolic hydroxyl groups, and plural $X^1$s may be the same or different, m is an integer of 1 or more, n is an integer of 1 or more, and k is an integer of 2 or more).

6 Claims, 5 Drawing Sheets

METHOD FOR PRODUCING ANTIOXIDANT AND METHOD FOR PRODUCING ELASTIC POLYURETHANE FIBER

CROSS-REFERENCE TO RELATED APPLICATIONS

This application is a U.S. national stage filing, under 35 U.S.C. § 371(c), of International Application No. PCT/JP2017/036651, filed on Oct. 10, 2017, which claims priority to Japanese Patent Application No. 2016-222292, filed on Nov. 15, 2016. The entire contents of each of the aforementioned applications are incorporated herein by reference.

TECHNICAL FIELD

The present invention relates to an antioxidant, a polyurethane elastic fiber, and a method for producing a polyurethane compound.

BACKGROUND ART

Polyurethane elastic fibers possess high elongation and superior elasticity, and are widely used for various clothing materials. However, polyurethane elastic fibers are easily colored and deteriorated due to light, heat, combustion gas, or the like. In order to avoid such coloration and deterioration, various stabilization methods such as the blending of a stabilizer have been proposed.

Japanese Examined Patent Application, Second Publication No. S62-043480 discloses a stabilizer for a polyurethane obtained from a specific trifunctional phenol compound and an organic diisocyanate compound. As the trifunctional phenol compound, a hindered phenol compound having steric hindrance is used, and as the organic diisocyanate compound, an aliphatic or alicyclic diisocyanate compound is used. Japanese Examined Patent Application, Second Publication No. S63-058851 discloses a method for stabilizing a polyurethane in which a specific hindered phenol compound having an acrylate group is subjected to a Michael addition reaction to the terminal amino group of the polyurethane. Japanese Examined Patent Application, Second Publication No. H05-024246 discloses that a polyurethane elastic fiber which is stable even for dry cleaning can be obtained by using a polycondensate of p-cresol and dicyclopentadiene as a stabilizer.

In general, a polyurethane polymer used for polyurethane elastic fibers is a relatively unstable polymer. In order to prevent gelation and achieve stable spinning, both the terminals of the polyurethane polymer are subjected to chain extension of a prepolymer with a diamine or a diol as described in Japanese Examined Patent Application, Second Publication No. S62-043480, Japanese Examined Patent Application, Second Publication No. S63-058851, and Japanese Examined Patent Application, Second Publication No. H05-024246, and at the same time, subjected to an inactive treatment with a terminal stopper.

SUMMARY OF INVENTION

However, when the stabilizer for a polyurethane disclosed in Patent Document 1 is synthesized, there is a problem in that the reaction between the hindered phenol compound having a steric hindrance and the aliphatic or alicyclic diisocyanate compound does not proceed without a catalyst. Even in the case of using an organometallic catalyst, the phenol group having a steric hindrance has low reactivity with the aliphatic/alicyclic diisocyanate. For this reason, the reaction proceeds slowly, and the side reaction of the isocyanate per se, or an allophanate reaction between a urethane group and an isocyanate group occurs to facilitate gelation. In addition, the contamination thereof is likely to cause yarn breakage during spinning of the polyurethane elastic fibers. The use of organometallic catalysts should be avoided from the viewpoint of environmental conservation. In addition, the compound obtained from the trifunctional phenol compound and the organic diisocyanate has a high concentration of urethane bonding groups in one molecule. For this reason, the affinity with the polyurethane polymer to be added tends to be reduced. As a result, migration to the fiber surface occurs, which causes the formation of scum, that is, yarn scum. Furthermore, the stabilizer compounds for a polyurethane disclosed herein are all obtained by reacting a trifunctional phenol compound with a bifunctional isocyanate compound, and the molecular weight of the stabilizer compound is increased by using the two functional groups of the trifunctional phenol compound in the urethane reaction. For this reason, such a reaction consumes two OH groups among three OH groups which are effective groups having an antioxidant function and this is not economical. In addition, in the preparation method described above, it is not appropriate to increase the molecular weight by using a bifunctional phenol compound.

In the method for stabilizing a polyurethane disclosed in Patent Document 2, in the both-terminal reaction product between the amino groups at both the terminals of the polyurethane and the acrylate, the amino group and the ester group are present in the vicinity in the single molecule. For this reason, at the time of carrying out a washing treatment under alkali conditions, the ester group easily undergoes hydrolysis in the molecule due to the catalytic action of the amino group mentioned above, and the effective group of the antioxidant function is removed from the polymer terminal, so that in dry cleaning after a washing treatment, the extraction resistance effect with respect to the dry cleaning solvent disappears.

In the polyurethane elastic fiber disclosed in Patent Document 3, there is a limit in increasing the degree of polymerization due to the side reactions and impurities in the raw materials at the time of producing the stabilizer, and those having a molecular weight of 1500 or less are specifically included. Most of the components with a molecular weight of 1500 or less are extracted with the solvents and the loss of the active ingredients is increased. Components having a molecular weight of 5000 or more impair the affinity with the polyurethane polymer or the solubility with a DMAc solvent. In addition, a $BF_3$ polymerization catalyst or a strong acid catalyst of sulfuric acid is used, and for this reason, the preparation process becomes complicated, such as requiring a neutralization step for removing the catalyst mentioned above, a washing step, a liquid separation step, and a solvent removal step by distillation, and the like. In addition, since a strong acid catalyst is used, a reaction apparatus made of an acid-resistant material having acid resistance and corrosion resistance is also required.

The present invention has been made in view of the circumstances mentioned above, and provides a polyurethane elastic fiber which exhibits superior spinning stability, imparts reduced scum formation, exhibits an increased strength retention index after a light resistance test, even after a washing treatment and a dry cleaning treatment, and exhibits little deterioration in heat resistance, and also provides an antioxidant for the polyurethane elastic fiber.

As a result of intensive studies, the inventors of the present application discovered that by using as an antioxidant a compound obtained by adding a hindered phenol compound to a terminal of a polyurethane compound via a urethane bond, a polyurethane elastic fiber can be produced, which exhibits superior spinning stability, imparts reduced scum formation, and exhibits superior durability against a washing treatment and a dry cleaning treatment. Thereby, the present invention was accomplished.

The present invention has the following aspects.

[1] An antioxidant containing a polyurethane compound represented by the following formula (1):

[Chem. 1]

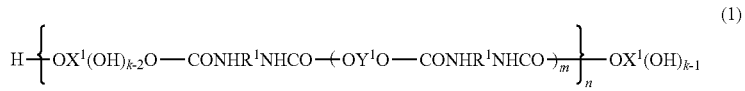

($Y^1$ is a residue of a diol, and plural $Y^1$s may be the same or different.

$R^1$ is a residue of an aromatic diisocyanate, and plural $R^1$s may be the same or different.

$X^1$ is a residue of a hindered phenol compound having at least k hindered phenolic hydroxyl groups, and plural $X^1$s may be the same or different.

m is an integer of 1 or more, n is an integer of 1 or more, and k is an integer of 2 or more.)

[2] The antioxidant according to the aforementioned [1], wherein the polyurethane compound represented by the aforementioned formula (1) has a number-average molecular weight ranging from 8,000 to 100,000.

[3] The antioxidant according to the aforementioned [1] or [2], wherein the hindered phenol compound is a hindered phenol compound represented by the formula: $X^1(OH)_k$ and having a hindered phenol group represented by any one of the following formula (6) to formula (11).

[Chem. 2]

(6)

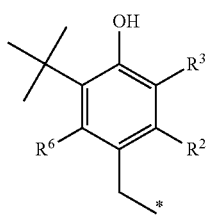

($R^2$, $R^3$, and $R^6$ are each independently a hydrogen atom or a methyl group. * represents a binding position.)

[Chem. 3]

(7)

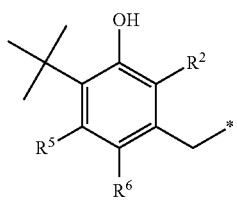

($R^2$, $R^5$, and $R^6$ are each independently a hydrogen atom or a methyl group. * represents a binding position.)

[Chem. 4]

(8)

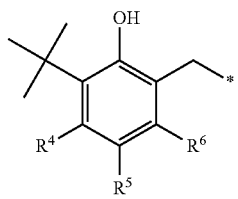

($R^4$, $R^5$, and $R^6$ are each independently a hydrogen atom or a methyl group. * represents a binding position.)

[Chem. 5]

(9)

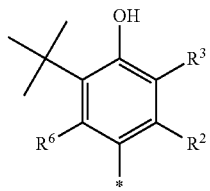

($R^2$, $R^3$, and $R^6$ are each independently a hydrogen atom or a methyl group. * represents a binding position.)

[Chem. 6]

(10)

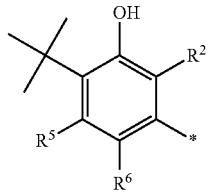

($R^2$, $R^5$, and $R^6$ are each independently a hydrogen atom or a methyl group. * represents a binding position.)

[Chem. 7]

(11)

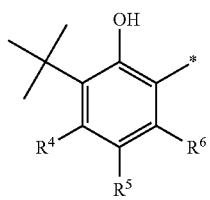

($R^4$, $R^5$, and $R^6$ are each independently a hydrogen atom or a methyl group. * represents a binding position.)

[4] The antioxidant according to the aforementioned [3], wherein the hindered phenol compound represented by the aforementioned formula: $X^1$ $(OH)_k$ is one or more compounds selected from the group consisting of 1,3,5-tris (2,6-dimethyl-3-hydroxy-4-tert-butylbenzyl) isocyanuric acid, triethylene glycol bis-3-(3-tert-butyl-4-hydroxy-5-methylphenyl) propionate, 3,9-bis [2-{3-(3-tert-butyl-4-hydroxy-5-methylphenyl) propionyloxy}-1,1-dimethylethyl]-2,4,8,10-tetraoxaspiro [5.5] undecene, and 4,4'-butylidenebis (6-tert-butyl-3-methylphenol).

[5] The antioxidant according to claim [1] or [2], wherein the hindered phenol compound is a hindered phenol compound represented by the formula: $X^1$ $(OH)_k$ and is a polymer having a hindered phenol group represented by the following formula (12) or formula (13).

[Chem. 8]

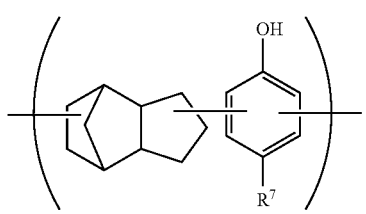

(12)

($R^7$ is an alkyl group having 1 to 4 carbon atoms.)

[Chem. 9]

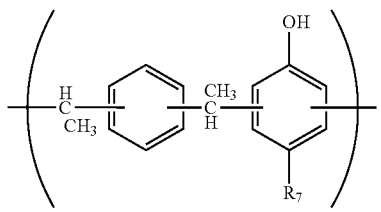

(13)

($R^7$ is an alkyl group having 1 to 4 carbon atoms.)

[6] The antioxidant according to the aforementioned [5], wherein the aforementioned hindered phenol compound is one or more compounds selected from the group consisting of a paracresol/dicyclopentadiene copolymer, a divinylbenzene/paracresol copolymer, and a paracresol/dicyclopentadiene/isobutene copolymer.

[7] A method for producing the antioxidant as recited in any one of the aforementioned [1] to [6], which contains reacting a diol compound represented by the following formula (2) with an aromatic diisocyanate compound represented by the following formula (3) in an excess molar amount with respect to the aforementioned diol compound, and reacting an isocyanate group of a urethane prepolymer represented by the following formula (4) with a phenol group of a hindered phenol compound represented by the following formula (5) in an excess equivalent with respect to the isocyanate group of the urethane prepolymer.

[Chem. 10]

$$HOY^1OH \qquad (2)$$

($Y^1$ is a residue of a diol and OH in formula (2) is an alcoholic hydroxyl group.)

[Chem. 11]

$$OCNR^1CNO \qquad (3)$$

($R^1$ is a residue of an aromatic diisocyanate.)

[Chem. 12]

($Y^1$ is a residue of a diol, and plural $Y^1$s may be the same or different.
$R^1$ is a residue of an aromatic diisocyanate, and plural $R^1$s may be the same or different. m is an integer of 1 or more.)

[Chem. 13]

$$X^1(OH)_k \qquad (5)$$

($X^1$ is a residue of a hindered phenol compound having k hindered phenolic hydroxyl groups, OH in the formula (5) is a hindered phenolic hydroxyl group, and k is an integer of 2 or more.)

[8] A polyurethane elastic fiber containing the antioxidant as recited in any one of the aforementioned [1] to [6] and a polyurethane polymer.

[9] The polyurethane elastic fiber according to the aforementioned [8], wherein a content ratio of a solid content of the antioxidant mentioned above to the polyurethane polymer mentioned above ranges from 0.01 to 20% by mass.

[10] The polyurethane elastic fiber according to the aforementioned [8] or [9], which is used for inner-wear, outer-wear, leggings, sportswear, jeans, swim wear, or rubber yarn products for diapers.

Effects of Invention

The antioxidant of the present invention contains a polyurethane compound represented by the formula (1) having a structure in which both the terminal isocyanate groups of a polyurethane having isocyanate groups at both the terminals are bonded to hindered phenol compounds. For this reason, superior affinity with a polyurethane polymer, which is a main component of a polyurethane elastic fiber, is exhibited, and scum (that is, yarn scum) formation is hardly caused. In addition, superior spinning stability, superior heat resistance, acid resistance, alkali resistance, and superior stability of the performance thereof are exhibited.

The antioxidant of the present invention has a relatively large number-average molecular weight. For this reason, the antioxidant is difficult to extract with a dry cleaning solvent, although it can be effectively function as an antioxidant even when a small amount thereof is added. In addition, it is possible to provide a polyurethane elastic fiber which has a high strength retention index after the light resistance test, even after the washing treatment and the dry cleaning treatment, exhibits superior coloring durability, and exhibits little deterioration in heat resistance.

Figure 1:
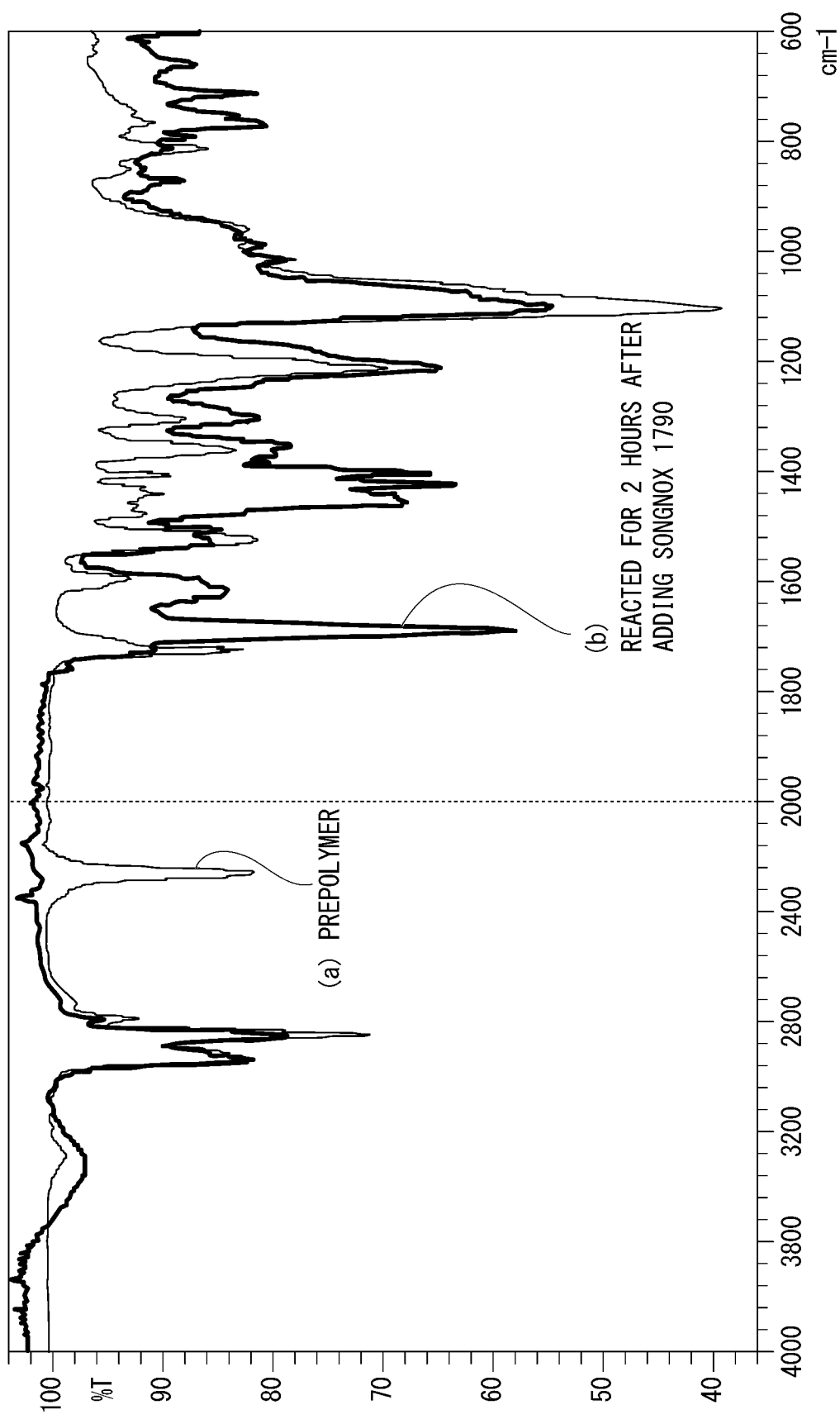
FIG. 1 shows examples of the IR measurement results at the time of producing an antioxidant according to the present invention.

MODES FOR CARRYING OUT THE INVENTION (Antioxidant)

The antioxidant of the present invention contains a polyurethane compound represented by the formula (1):

[Chem. 14]

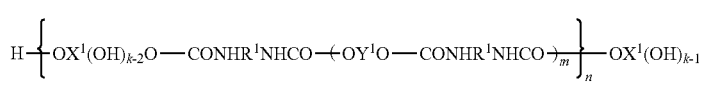

(1)

($Y^1$ is a residue of a diol, and plural $Y^1$s may be the same or different.

$R^1$ is a residue of an aromatic diisocyanate, and plural $R^1$s may be the same or different.

$X^1$ is a residue of a hindered phenol compound having at least k hindered phenolic hydroxyl groups, and plural $X^1$s may be the same or different.

m is an integer of 1 or more, n is an integer of 1 or more, and k is an integer of 2 or more.)

That is, the polyurethane compound represented by the formula (1) has a structure in which both the terminals of the urethane prepolymer represented by the formula (4) are bonded to the hindered phenol compounds represented by the formula (5) (n=1), or a structure in which a plurality of urethane prepolymers represented by the formula (4) are bonded via a hindered phenol compound represented by the formula (5) (n≥2).

$Y^1$ is a residue of a diol represented by $HOY^1OH$. Both OH groups of "$HOY^1OH$" are alcoholic hydroxyl groups. The diol represented by $HOY^1OH$ is not limited. A low-molecule polyol having a molecular weight of less than 200, such as ethylene glycol, propylene glycol, 1,3-propanediol, or 1,4-butanediol may be used, but a polyol having a number-average molecular weight ranging from 200 to 4000 is preferable, a polyol having a number-average molecular weight ranging from 400 to 3,000 is more preferable, and a high-molecular polyol having a number-average molecular weight ranging from 600 to 2,000 is, in particular, preferable.

As examples of the high-molecular polyol, mention may be made of various diols composed of substantially linear homo- or copolymers such as a polyester diol, a polyether diol, a polylactone diol, a polyester amide diol, a polyacryl diol, a polythioester diol, a polythioether diol, a polyhydrocarbon diol, a polycarbonate diol, a polysiloxane diol, a polyurethane diol, a mixture thereof, or a copolymer thereof, and the like.

As examples of the polyester diol, mention may be made of an adipate-based polyester diol obtained by a condensation dehydration reaction between a dibasic acid such as adipic acid or phthalic acid and a glycol such as ethylene glycol or 1,4-butanediol, a polycaprolactone diol obtained by ring-opening polymerization of ε-caprolactone, and the like.

As examples of the polyether diol, mention may be made of polyoxyethylene glycol, polyoxypropylene glycol, polytetramethylene ether glycol, polyoxypentamethylene glycol, a copolymerized polyether glycol composed of a tetramethylene group and a 2,2-dimethylpropylene group, a copolymerized polyether glycol composed of a tetramethylene group and a 3-methyltetramethylene group, or a mixture thereof, and the like.

$R^1$ is a residue of an aromatic diisocyanate represented by $OCNR^1NCO$. As examples of the aromatic diisocyanate represented by $OCNR^1NCO$, mention may be made of 4,4'-diphenylmethane diisocyanate (MDI), 2,4'-diphenylmethane diisocyanate, 2,4-tolylene diisocyanate, 2,6-tolylene diisocyanate, p-phenylene diisocyanate, 1,5-naphthalene diisocyanate, m-xylylene diisocyanate, p-xylylene diisocyanate, α,α,α',α'-tetramethyl-xylylene diisocyanate, 4,4'-diphenyl ether diisocyanate, or a mixture thereof, or a copolymer thereof, and the like.

$X^1$ is a residue of a hindered phenol compound having k or more hindered phenolic hydroxyl groups, k is an integer of 2 or more, may be 2, is preferably 3, and may be 4 or more. Each of the k OH groups of the formula "$X^1(OH)_k$" is a hindered phenolic hydroxyl group. The hindered phenol compound represented by the formula "$X^1(OH)_k$" is not limited. In general, a hindered phenol compound sold as a hindered phenol antioxidant can be used.

For example, the hindered phenol compound represented by the formula "$X^1(OH)_k$" preferably has a hindered phenol group represented by any one of formula (6) to formula (11).

[Chem. 15]

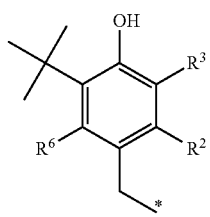

(6)

($R^2$, $R^3$, and $R^6$ are each independently a hydrogen atom or a methyl group. * represents a binding position.)

[Chem. 16]

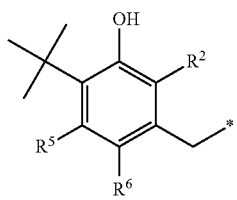
(7)

($R^2$, $R^5$, and $R^6$ are each independently a hydrogen atom or a methyl group. * represents a binding position.)

[Chem. 17]

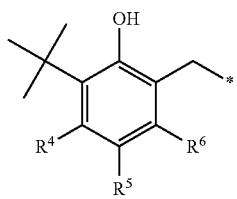
(8)

($R^4$, $R^5$, and $R^6$ are each independently a hydrogen atom or a methyl group. * represents a binding position.)

[Chem. 18]

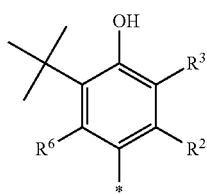
(9)

($R^2$, $R^3$, and $R^6$ are each independently a hydrogen atom or a methyl group. * represents a binding position.)

[Chem. 19]

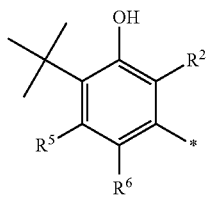
(10)

($R^2$, $R^5$, and $R^6$ are each independently a hydrogen atom or a methyl group. * represents a binding position.)

[Chem. 20]

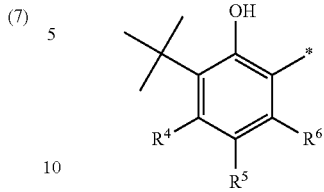
(11)

($R^4$, $R^5$, and $R^6$ are each independently a hydrogen atom or a methyl group. * represents a binding position.)

As examples of the hindered phenol compound represented by the formula "$X^1$ $(OH)_k$" and having a hindered phenol group represented by any one of formula (6) to formula (11), mention may be made of 1,3,5-tris (2,6-dimethyl-3-hydroxy-4-tert-butylbenzyl) isocyanuric acid (product name: Songnox 1790, manufactured by Songwon Industrial Co., Ltd.), triethylene glycol bis-3-(3-tert-butyl-4-hydroxy-5-methylphenyl) propionate (product name: Songnox 2450, manufactured by Songwon Industrial Co., Ltd.), 3,9-bis [2-{3-(3-tert-butyl-4-hydroxy-5-methylphenyl) propionyloxy}-1,1-dimethylethyl]-2,4,8,10-tetraoxaspiro [5.5] undecene (product name: ADEKA STAB (registered trademark) AO-80, manufactured by ADEKA CORPORATION), 4,4'-butylidene-bis (6-tert-butyl-3-methylphenol) (product name: Songnox 4425, manufactured by Songwon Industrial Co., Ltd.), and the like.

The hindered phenol compound represented by the formula "$X^1$ $(OH)_k$" may be a polymer having a hindered phenol group represented by formula (12) or formula (13) in the polymer.

[Chem. 21]

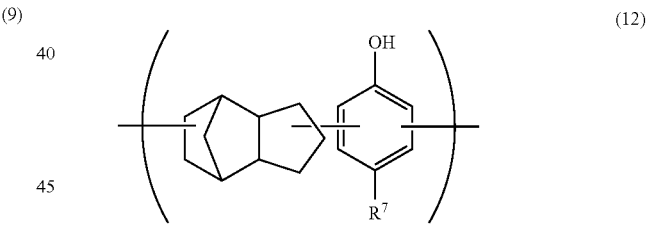
(12)

($R^7$ is an alkyl group having 1 to 4 carbon atoms.)

[Chem. 22]

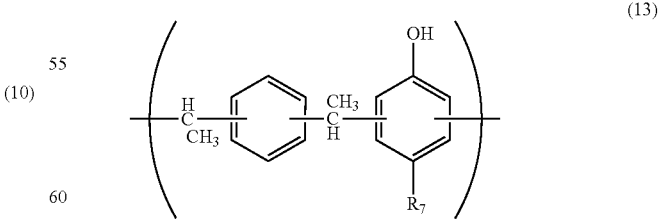
(13)

($R^7$ is an alkyl group having 1 to 4 carbon atoms.)

As examples of the hindered phenol compound represented by the formula "$X^1$ $(OH)_k$" and having a hindered phenol group represented by the formula (12) or formula (13), mention may be made of a paracresol/dicyclopentadiene copolymer, a divinylbenzene/paracresol copolymer, a paracresol/dicyclopentadiene/isobutene copolymer, and the like.

The number-average molecular weight of the polyurethane compound represented by the formula (1) preferably ranges from 8,000 to 100,000, more preferably ranges from 10,000 to 80,000, and in particular, preferably ranges from 15,000 to 50,000.

The amount of the hindered phenolic OH group contained with respect to the solid content of the antioxidant containing the polyurethane compound represented by the formula (1) is preferably $1 \times 10^{-4}$ mol/g or more, more preferably $2 \times 10^{-4}$ mol/g or more, and particularly preferably $4 \times 10^{-4}$ mol/g or more.

In order to sufficiently exhibit the effect of the antioxidant of the present invention, the total OH group amount (A) of the antioxidant preferably ranges from $0.10 \times 10^{-3}$ to $3.00 \times 10^{-3}$ mol/g, more preferably ranges from $0.30 \times 10^{-3}$ to $2.00 \times 10^{-3}$ mol/g, and particularly preferably ranges from $0.50 \times 10^{-3}$ to $1.5 \times 10^{-3}$ mol/g.

Among the antioxidants of the present invention, the OH group amount (B) obtained by subtracting the OH group amount of the unreacted raw material of the phenol compound ranges from $0.10 \times 10^{-3}$ to $1.80 \times 10^{-3}$ mol/g, more preferably ranges from $0.30 \times 10^{-3}$ to $1.60 \times 10^{-3}$ mol/g, and in particular, preferably ranges from $0.50 \times 10^{-3}$ to $1.40 \times 10^{-3}$ mol/g.

Among the antioxidants of the present invention, the OH group amount (C) of the polyurethane compound corresponding to that of $m \geq 1$ and $n \geq 1$ in the formula (1) preferably ranges from $0.10 \times 10^{-3}$ to $1.80 \times 10^{-3}$ mol/g, more preferably ranges from $0.20 \times 10^{-3}$ to $1.60 \times 10^{-3}$ mol/g, and in particular, preferably ranges from $0.30 \times 10^{-3}$ to $1.40 \times 10^{-3}$ mol/g.

The ratio of the OH group amount (B) with respect to the OH group amount (A) of the antioxidant of the present invention is 1 or less. In the case of containing an unreacted raw material hindered phenol compound, easier preparation can be achieved, and both the laundry resistance and the dry cleaning resistance can be exhibited as an antioxidant. For this reason, the ratio mentioned above is preferably less than 1, more preferably 0.99 or less, still more preferably 0.95 or less, and in particular, preferably 0.90 or less.

The ratio of the OH group amount (B) with respect to the OH group amount (A) of the antioxidant of the present invention is preferably 0.50 or more, more preferably 0.60 or more, still more preferably 0.70 or more, and in particular, preferably 0.75 or more.

The ratio of the OH group amount (C) with respect to the OH group amount (A) of the antioxidant of the present invention is preferably 0.45 or more, more preferably 0.50 or more, still more preferably 0.55 or more, and in particular, preferably 0.60 or more.

(Method for Producing Antioxidant)

The diol compound represented by the formula (2) and the aromatic diisocyanate compound represented by the formula (3) in an excessive molar amount with respect to the amount of the diol compound represented by the formula (2) are reacted. Thereby, a urethane prepolymer (PUPP) represented by the formula (4) can be obtained. The aforementioned excessive molar amount is an amount ranging from 1.01 to 2.1 times the moles of the diol, and such an amount of the aromatic diisocyanate can be used. On the other hand, if the amount is less than 1.0 times, the terminal group of the urethane prepolymer represented by the formula (4) becomes a hydroxyl group and does not react with the hindered phenol compound. If the amount exceeds 2.1 times, the aromatic diisocyanate compound is unreacted and remains in a large amount, and the reaction product tends to become a gel due to a side reaction of the isocyanate group. The preferable excessive amount ranges from 1.2 to 1.9 times excessive moles, and more preferably ranges from 1.3 to 1.8 times excessive moles. As the excessive moles are reduced, the urethane prepolymer represented by the formula (4) and the finally obtained polyurethane compound represented by the formula (1) become increased in molecular weight. As the excessive moles are increased, the molecular weight is reduced. The molecular weight of the urethane prepolymer represented by the formula (4) can also be controlled by the molecular weight of the diol compound represented by the formula (2) or the molecular weight of the aromatic diisocyanate compound represented by the formula (3).

The number-average molecular weight of the urethane prepolymer (PUPP) represented by the formula (4) preferably ranges from 6,000 to 80,000, more preferably ranges from 8,000 to 60,000, and in particular, preferably ranges from 10,000 To 40,000.

The antioxidant containing the polyurethane compound represented by the formula (1) can be obtained by reacting the isocyanate group of the urethane prepolymer (PUPP) urethane prepolymer represented by the formula (4) with the phenol group of the hindered phenol compound represented by the formula (5) in an excessive amount with respect to the amount of the isocyanate group of the urethane prepolymer mentioned above, as a mixture of the hindered phenol compound represented by the formula (5) and the polyurethane compound represented by the formula (1). The polyurethane compound represented by the formula (1) has a relatively high molecular weight, and on the other hand, the hindered phenol compound represented by the formula (5) has a relatively low molecular weight. In order to adjust the molecular weight for the purpose of improving the affinity with the polyurethane, an antioxidant can be prepared by removing the hindered phenol compound represented by the formula (5). However, the hindered phenol compound represented by the formula (5), per se, also serves as an antioxidant. For this reason, the mixture as it is can be used as an antioxidant without removing the hindered phenol compound.

The antioxidant containing the polyurethane compound represented by the formula (1) may contain a reaction solvent. As the reaction solvent, an amide-based polar solvent such as dimethylformamide, dimethylsulfoxide, or dimethylacetamide can be used. Dimethylacetamide (DMAc) is preferable. A solvent such as dimethylacetamide (DMAc) may be contained at the time of spinning of the polyurethane elastic fiber, and it can be removed during the spinning step.

The alicyclic or aliphatic diisocyanate compound has low reactivity with a phenolic compound having a steric hindrance and is less reactive than the aromatic diisocyanate compound even in the case of using an organometallic catalyst, and the reaction requires a long period of time. For this reason, gelation easily occurs due to the side reaction of the isocyanate group proceeding. On the other hand, the reaction between the diol compound represented by the formula (2) and the aromatic diisocyanate compound is more reactive, as compared with the case where the alicyclic or aliphatic diisocyanate compound is used. For this reason, the reaction proceeds promptly without using a catalyst. In the reaction between the diol compound represented by the formula (2) and the aromatic diisocyanate compound, an amine-based catalyst or an organometallic catalyst is not required, the urethane formation reaction is completed in a short period of time, and a side reaction hardly occurs. Therefore, gelling hardly occurs, and yarn breakage can hardly occur at the time of spinning polyurethane elastic fibers containing the same.

Even in the process for producing an antioxidant of the present invention, it is possible to shorten the reaction time by using a known amine-based catalyst or organometallic catalyst which is effective for accelerating the urethane formation reaction. However, the antioxidant obtained using the catalyst is easily colored, and gelation easily occurs due to the side reactions caused by the isocyanate group. In addition, from the viewpoint of environmental conservation, it is preferable not to use a catalyst.

(Polyurethane Elastic Fiber) The polyurethane elastic fiber of the present invention contains the aforementioned antioxidant and a polyurethane polymer.

The content ratio of the solid content of the antioxidant to the polyurethane polymer mentioned above preferably ranges from 0.01 to 20% by mass, more preferably ranges from 0.1 to 15% by mass, and in particular, preferably ranges from 0.5 to 10% by mass.

In the present specification, the polyurethane polymer refers to a polymer other than the polyurethane compound represented by the formula (1) among the polymers having a urethane group which constitute the polyurethane elastic fiber. The polyurethane polymer may be a polyurethane urea polymer used for ordinary polyurethane elastic fibers, or may be a polymer composed only of polyurethane.

With respect to the method for producing the polyurethane polymer, known polyurethane-forming reaction techniques such as a prepolymer method and a one-shot method can be used. For example, a polyurethane compound can be obtained by reacting a high-molecular polyol and a diisocyanate under conditions of an excess amount of diisocyanate to synthesize a urethane prepolymer having an isocyanate group at the terminal, and subsequently subjecting the urethane prepolymer mentioned above to a chain extension reaction with a low-molecular diol.

The polyurethane urea polymer can be obtained, for example, by reacting a high-molecular polyol, a diisocyanate, a diamine, and a terminal stopper having a monofunctional active hydrogen atom.

As examples of the high-molecular polyol used for producing the polyurethane polymer, mention may be made of the high-molecular polyols listed as those for use in the production of the aforementioned antioxidant. The high-molecular polyols may be the same or different. From the viewpoint of affinity, the same kind of high-molecular polyols are preferable.

As examples of the diisocyanate used for producing the polyurethane polymer, mention may be made of the aromatic diisocyanate compounds listed as those for use in the production of the antioxidant mentioned above. In addition thereto, aliphatic or alicyclic diisocyanate compounds may also be mentioned.

The polyurethane polymer preferably has so-called soft segments and hard segments. The soft segments are relatively long-chain segments such as polyethers, polyesters, or polyether esters and the hard segments are relatively short-chain segments derived by the reaction of isocyanates with diamines or diol chain extenders. Such a long-chain polymer can be usually prepared by capping a hydroxyl-terminated soft segment precursor with an organic diisocyanate to form a prepolymer and chain-elongating the prepolymer with a diamine or a diol.

As the diamine used for chain extension of the prepolymer, a known diamine can be used. As examples thereof, mention may be made of ethylenediamine, 1,2-propylenediamine, 1,3-cyclohexanediamine, 1,4-cyclohexanediamine and the like. They can be used alone or in combination of two or more types thereof.

The polyurethane elastic fibers of the present invention can be produced by spinning a spinning dope which contains an antioxidant containing the polyurethane compound represented by the formula (1) and the polyurethane polymer mentioned above.

In the polyurethane elastic fibers of the present invention, as the type of the polyol used in the production of each of the polyurethane polymer and the polyurethane compound represented by the formula (1) contained in the antioxidant, a combination of plural types of polyols can be used. From the viewpoint of affinity, the types thereof are preferably the same. That is, when the polyol used in the production of the polyurethane polymer is a polyester diol, the polyol used in the production of the polyurethane compound represented by the formula (1) contained in the antioxidant is preferably a polyester diol. In addition, when the polyol used in the production of the polyurethane polymer is a polyether diol, the polyol used in the production of the polyurethane compound represented by the formula (1) contained in the antioxidant is preferably a polyether diol. In addition, when the polyol used in the production of the polyurethane polymer is a polycarbonate diol, the polyol used in the production of the polyurethane compound represented by the formula (1) contained in the antioxidant is preferably a polycarbonate diol. In addition, when the polyol used in the production of the polyurethane polymer is a polylactone diol, the polyol used in the production of the polyurethane compound represented by the formula (1) contained in the antioxidant is preferably a polylactone diol.

In the polyurethane elastic fiber of the present invention, the type of the diisocyanate used for producing each of the polyurethane polymer and the polyurethane compound represented by formula (1) contained in the antioxidant is preferably the same aromatic diisocyanate.

As examples of the solvents used for spinning polyurethane elastic fibers using a long chain polyurethane polymer as a raw material, mention may be made of dimethylacetamide (DMAc), dimethylformamide, dimethylsulfoxide, N-methylpyrrolidone and the like. DMAc is preferable. The concentration of the long-chain polyurethane polymer preferably ranges from 25 to 50% by mass, and in particular, ranges from 30 to 40% by mass, based on the total mass of the raw material solution, and is suitable for a dry spinning method using a solvent.

In usual, when a diol is used as the chain extender, the polyurethane elastic fiber is spun by a melt spinning method, a dry spinning method, a wet spinning method, or the like. When a diamine is used as the chain extender, the polyurethane elastic fiber is obtained by a dry spinning method. In the present invention, the spinning method is not particularly limited, but a dry spinning method using a solvent is preferable.

Furthermore, a heat stabilizer of a known organic compound or inorganic compound which is useful for the polyurethane polymer, an antioxidant, an ultraviolet inhibitor, an anti-yellowing agent, a thermal discoloration inhibitor and a stabilizer for polyurethane with respect to a sterilizing chlorine agent of pool water such as hydrotalcite, huntite, zinc oxide or the like, may be added. The polyurethane urea elastic fiber of the present invention may contain various stabilizers, pigments and the like, as necessary, within a range which does not inhibit the effects of the present invention. For example, a benzotriazole-based agent such as "Tinuvin (registered trademark)" manufactured by Ciba Geigy AG, a benzophenone-based agent, a phosphorus-based agent such as "SUMILIZER (registered trademark)" P-16 manufactured by Sumitomo Chemical Co., Ltd., various hindered amine-based agents, inorganic pigments such as titanium oxide and carbon black, fluorine-based resin powder or silicone-based resin powder, metal soap such as magnesium stearate, disinfectants containing silver, zinc, or compounds thereof, deodorants, lubricants such as silicone and mineral oil, and various antistatic agents such as barium sulfate, cerium oxide, betaine and phosphoric acid and the like are added, and they are present by being reacted with the polymer. In addition, in order to further enhance the durability to light, various kinds of nitric oxide, and the like, known anti-yellowing agents effective for polyurethane polymers, and nitrogen oxide scavengers such as HN-150, manufactured by Nippon Finechem Co., Ltd., thermal oxidation stabilizers, light stabilizers, for example, a light stabilizer such as "SUMISORB (registered trademark)" 300 #622 manufactured by Sumitomo Chemical Co., Ltd., and the like are preferably contained.

The polyurethane polymer composition thus obtained can be formed into a fibrous form by a conventionally known dry spinning method.

At this time, a known oil agent for polyurethane elastic fibers may be further adhered as an oil agent from the outside by using an oiling device at the time of spinning. The oil agent components used herein may use, in addition to the ether-modified silicone, combinations of various types of polyester-modified silicone, polyether-modified silicone, polyamino-modified silicone, polyorganosiloxane, mineral oil, mineral fine particles such as talc, silica, colloidal alumina, and the like, higher fatty acid metal salt powder such as magnesium stearate and calcium stearate, and waxes which are solid at room temperature such as higher aliphatic carboxylic acid, higher aliphatic alcohol, paraffin polyethylene and the like.

In practice, the polyurethane elastic fiber thus obtained may be used as it is as a bare yarn, or as a coated elastic fiber which is coated with other fibers such as polyamide fiber, wool, cotton, regenerated fiber, polyester fiber and the like, which are conventionally known. In particular, it is preferable to use the polyurethane elastic fiber in combination with a fiber material selected from the group consisting of nylon, ester, acrylic, natural fiber and cellulose derivative.

EXAMPLES

Hereinafter, the present invention will be described in detail with reference to examples, but the present invention is not limited to these examples. In the following description, "parts" represents "parts by mass". Various evaluations were carried out in accordance with the following methods.

[Conditions for Infrared Absorption Spectrum Analysis]

Analysis of the infrared absorption spectrum in the Examples was carried out under the following measurement conditions.

Apparatus: IR Affinity-1S model, manufactured by Shimadzu Corporation

Detector: MIracle 10

Sample stage: ATR prism plate (diamond/ZnSe)

[Conditions for Molecular Weight Measurement]

GPC analysis of various polymer compounds such as urethane prepolymer (PUPP), polyurethane compound, and the like was carried out under the following measurement conditions, and the molecular weight calculated in terms of polystyrene was obtained.

Sample concentration: 0.1% by mass (DMF solution)

Injection amount: 50 μl

Liquid feeding pump: LC-20 AD, manufactured by Shimadzu Corporation

Column oven: CT 0-20 A, manufactured by Shimadzu Corporation

Detector: SPD-M 20 A, manufactured by Shimadzu Corporation

Eluent: DMF

Flow rate: 1 ml/min

Column temperature: 40° C.

Column: Shodex (registered trademark) GPC KD-804+ KD-803, manufactured by Showa Denko KK

[Conditions for Thermal Weight (TGA) Measurement]

The analysis of the thermal weight (TGA) was carried out under the following measurement conditions.

Apparatus: TGA-50, manufactured by Shimadzu Corporation

Sample quantity: 10.7 mg

Temperature condition: starting temperature 25° C.→10° C./1 min: rate of increasing temperature→finishing temperature 500° C.

[Method of Calculating the Amount of OH Group]

The method of calculating the amount of the OH group (A), the amount of the OH group (B) and the amount of the OH group (C) of the antioxidant when the reaction product obtained by reacting the urethane prepolymer with the hindered phenol compound is used as an antioxidant without fractionation, is described below.

[Method of Calculating the Amount of OH Group (A)]

The amount of the OH group (A) is the theoretical amount of the OH group obtained from the charged ratio of each raw material. The amount of the OH group (A) was calculated from the following equation:

$$\begin{aligned}\text{Amount of OH group }(A)(\text{mol/g}) = &(\text{Charged ratio of raw material diol compound }(X1) \div \text{Molecular weight of raw material diol compound} \times 2) + \\ &((\text{Charged ratio of raw material phenol compound }(X2) \div \text{Molecular weight of raw material phenol compound} \times \text{Number of OH group per molecule of raw material phenol compound}) - \\ &(\text{Charged ratio of raw material diisocyanate compound }(X3) \div \text{Molecular weight of raw material diisocyanate compound} \times 2)\end{aligned}$$

X (g): Total charged amount of each raw material a (g): Reaction charged amount of raw material diol compound b (g): Reaction charged amount of raw material phenol compound c (g): Reaction charged amount of raw material diisocyanate compound $$X = a+b+c = \text{Reaction charged amount } a(g) \text{ of raw material diol compound} + \text{Reaction charged amount } b(g) \text{ of raw material phenol compound} + \text{Reaction charged amount } c(g) \text{ of diisocyanate compound}$$

$$\text{Charged ratio of raw material diol compound }(X1) = a \div X$$

$$\text{Charged ratio of raw material phenol compound }(X2) = b \div X$$

$$\text{Charged ratio of raw material diisocyanate compound }(X3) = c \div X$$

[Method of Calculating the Amount of OH Group (B)]

The amount of the OH group (B) is the amount of the OH group excluding the amount of the OH group of the unreacted raw material phenol compound in the antioxidant. The method for calculating the amount of the OH group (B) is as follows.

A calibration curve was prepared in advance from the GPC chromatogram of the raw material phenol compound. In addition, from the GPC chromatogram of the antioxidant after completion of the reaction with the prepolymer, the amount of the reacted phenol compound (b') and the amount of the unreacted phenol compound (b") were calculated. In addition, the ratio (X'2) of the reacted phenol compound was calculated.

b' (g): Amount of the reacted phenol compound
b" (g): Amount of the unreacted phenol compound $$b=b'+b''$$

Ratio of the reacted phenol compound $(X'2)=b'\div X$

The amount of the OH group (B) was calculated by substituting the charged ratio of the raw material phenol compound (X2) in the aforementioned formula for calculating the amount of the OH group (A) to the ratio of the reacted phenol compound (X'2), based on the following equation.

Amount of the OH group (B) (mol/g)=(Charged ratio of raw material diol compound (X1)÷Molecular weight of raw material diol compound×2)+((Ratio of reacted phenol compound (X'2)÷Molecular weight of raw material phenol compound× Number of OH groups per one molecule of raw material phenol compound)−(Charged ratio of raw material diisocyanate compound (X3)÷Molecular weight of raw material diisocyanate compound×2)

[Method for Calculating Amount of OH Group (C)]

The amount of the OH group (C) is the amount of the OH groups of the polyurethane compound corresponding to m≥1 and n≥1 in the formula (1) among the antioxidants.

The amount of the OH group (C) was obtained by conversion from the GPC chromatogram, the area ratio of the polyurethane compound corresponding to m≥1 and n≥1 in the formula (1), the area ratio of the compound corresponding to m=0 and n≥1 in the formula (1), and the area ratio of the raw material phenol compound.

[Preparation Example of Polyurethane-Based Hindered Phenol Antioxidant]

Example 1

233 g of polytetramethylene glycol having a number-average molecular weight of 1,850 and 56 g of 4,4'-diphenylmethane diisocyanate were reacted under stirring in a dry nitrogen atmosphere for 3 hours at 70° C. to obtain a urethane prepolymer (PUPP) having isocyanate groups at both terminals. The IR of this urethane prepolymer (PUPP) is shown in (a) of FIG. 1, and the GPC chromatogram is shown in (a) of FIG. 2. The weight-average molecular weight (Mw) of the urethane prepolymer (PUPP) was 30,151 and the number-average molecular weight (Mn) was 22,846. A small peak at Rt (retention time)=21.68 min belongs to the unreacted 4,4'-diphenylmethane diisocyanate.

Figure 2:
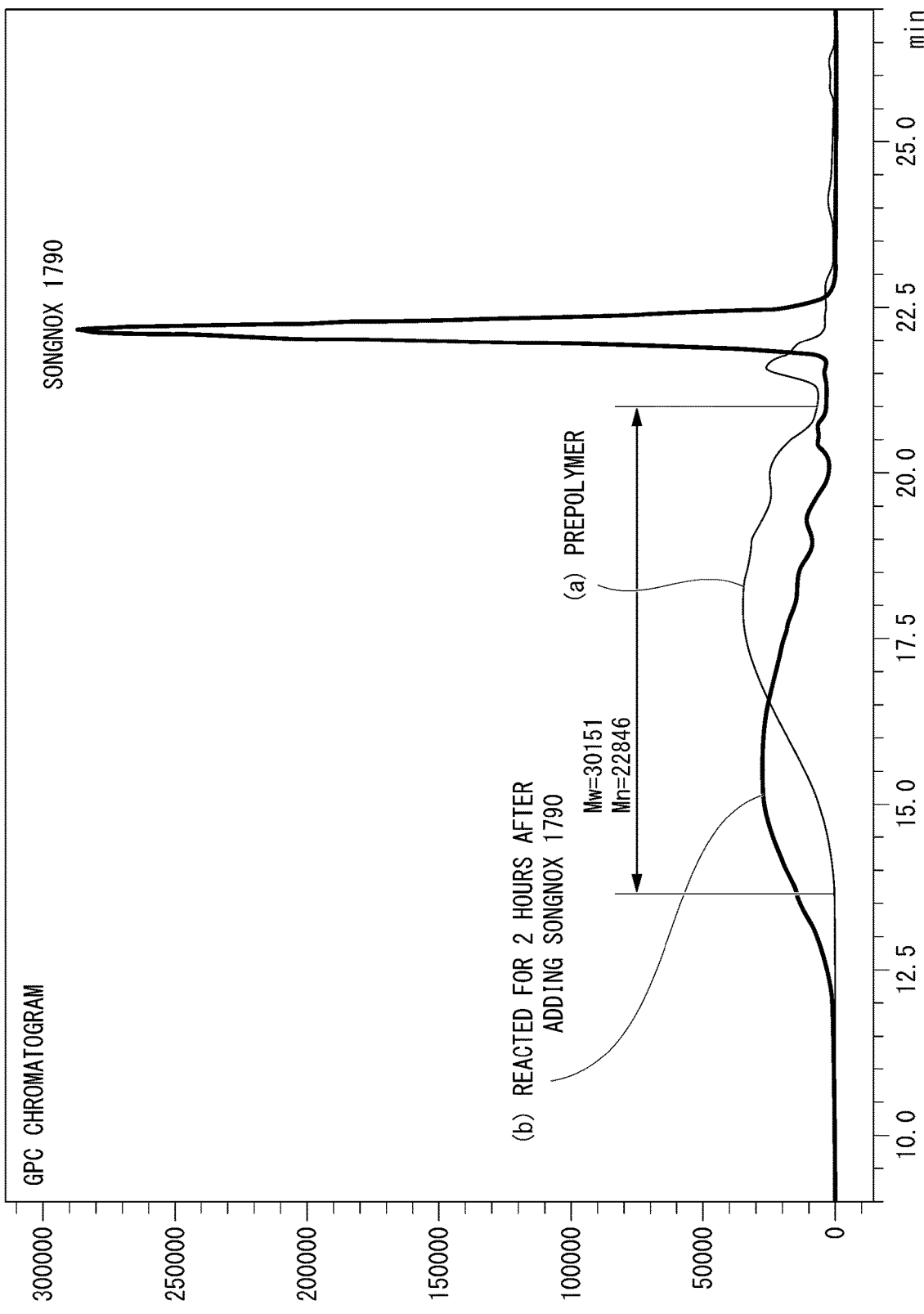
FIG. 2 shows examples of the GPC chromatograms at the time of producing an antioxidant according to the present invention.
Figure 3:
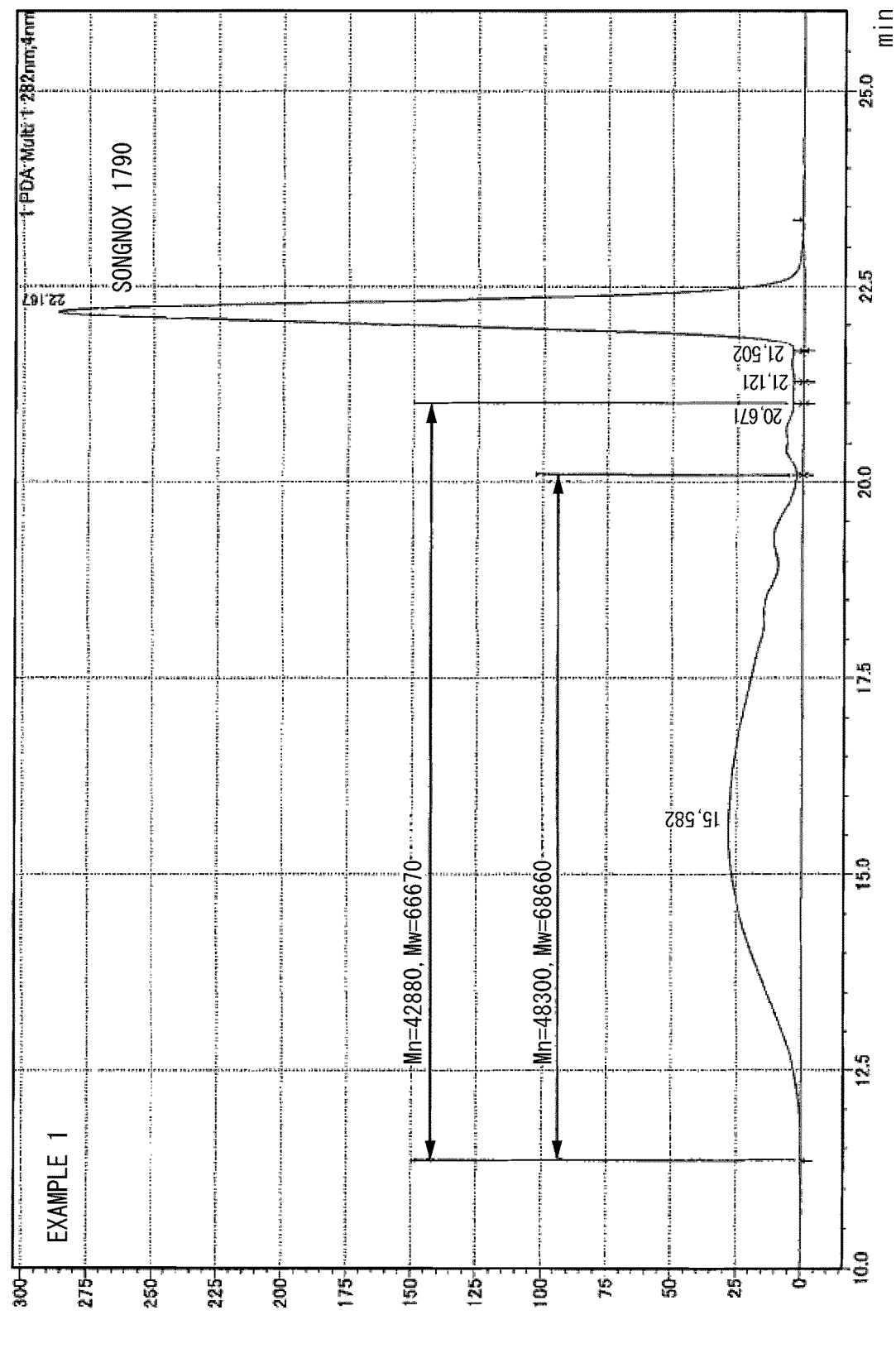
FIG. 3 shows an example of a GPC chromatogram of an antioxidant according to the present invention.

After cooling the urethane prepolymer (PUPP) to room temperature, a solution obtained by dissolving 211 g of 1,3,5-tris (4-tert-butyl-3-hydroxy-2,6-dimethylbenzyl) isocyanuric acid (product name: Songnox 1790 (in the aforementioned formula (5) wherein k=3), manufactured by Sonwon Industrial Co., Ltd.) in 500 g of dimethylacetamide (DMAc) so as to obtain a DMAc solution having a concentration of the total solid content of 50% by weight was added to the urethane prepolymer (PUPP). Thereafter, the temperature was gradually increased while stirring, and the reaction was carried out for 2 hours at 70° C. After it was confirmed that the isocyanate group at 2266 $cm^{-1}$ disappeared by IR measurement of the solution after 2 hours of this reaction, the solution was cooled to room temperature. The GPC chromatogram of the urethane prepolymer (PUPP) is shown in (a) of FIG. 2, and the GPC chromatogram after reaction for 2 hours is shown in (b) of FIG. 2. The weight-average molecular weight (Mw) of the polyurethane compound portion excluding the Songnox 1790 portion was 66,670, and the number-average molecular weight (Mn) thereof was 42,880. In addition, the weight-average molecular weight (Mw) and the number-average molecular weight (Mn) of the polyurethane compound portion corresponding to the formula (1) wherein m≥1, and n≥1 were 68,660 and 48,300, respectively. FIG. 3 shows the GPC chromatogram showing the evaluation part to clarify the average molecular weight.

The obtained polyurethane-based hindered phenol antioxidant (AO-1) contains a polyurethane compound represented by the formula (1) mentioned above, 1,3,5-tris (4-tert-butyl-3-hydroxy-2,6-dimethylbenzyl) isocyanuric acid, and DMAc as a solvent.

Figure 4:
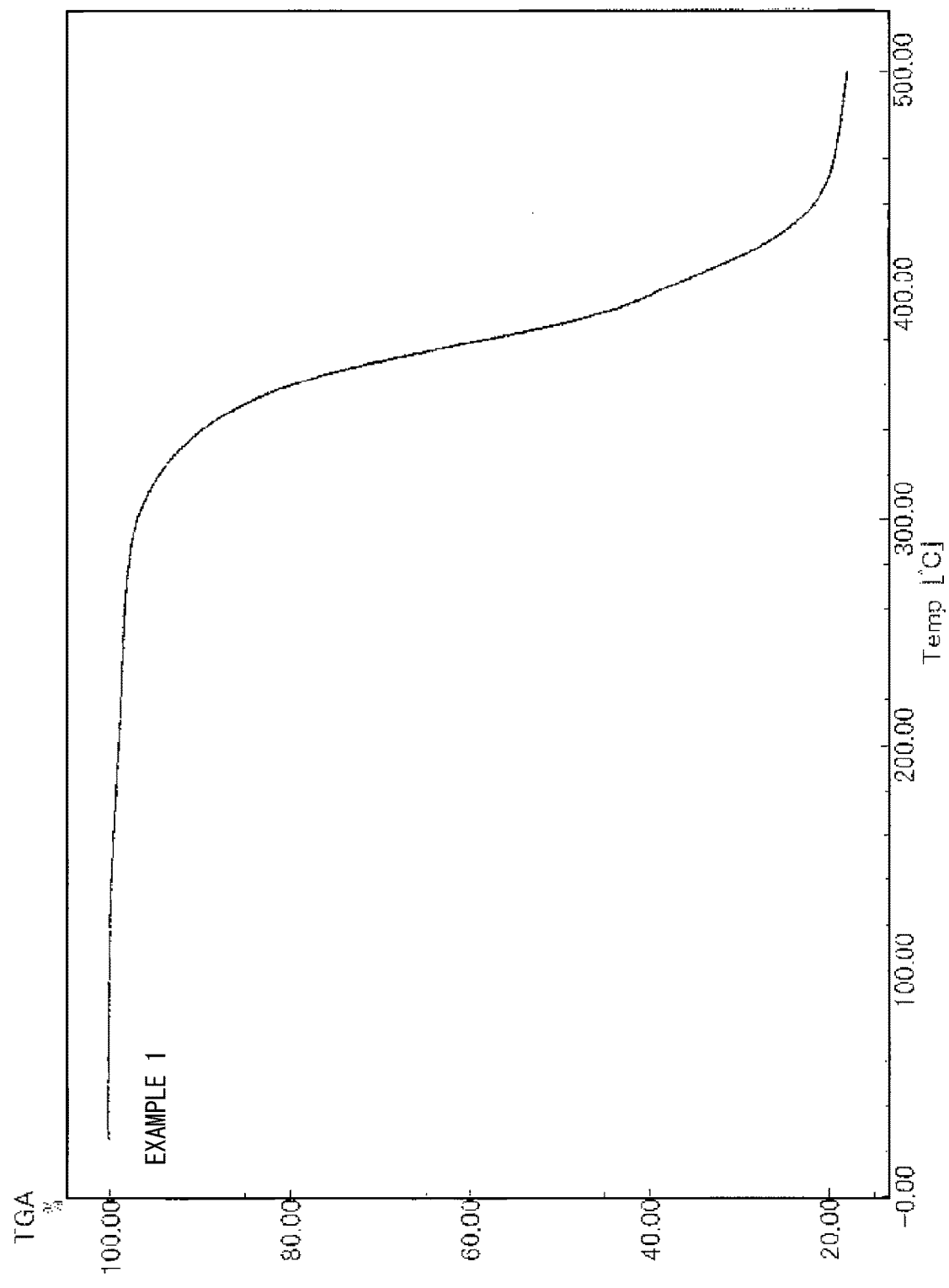
FIG. 4 shows a TGA chart after an antioxidant according to the present invention was dried under reduced pressure to remove DMAc.

FIG. 4 shows a TGA chart after the polyurethane-based antioxidant (AO-1) was dried under reduced pressure to remove DMAc. From this TGA, it can be seen that the solid component of this polyurethane-based antioxidant (AO-1) has thermal stability up to around 300° C., and is stable to heat even in the dry spinning process of polyurethane elastic fibers.

The IR chart of this polyurethane-based antioxidant (AO-1) is shown in (b) of FIG. 1 in comparison with the urethane prepolymer (PUPP) (a). Table 2 shows the number-average molecular weight and the amount of the OH group (A), the amount of the OH group (B), and the amount of the OH group (C).

Example 2

Figure 5:
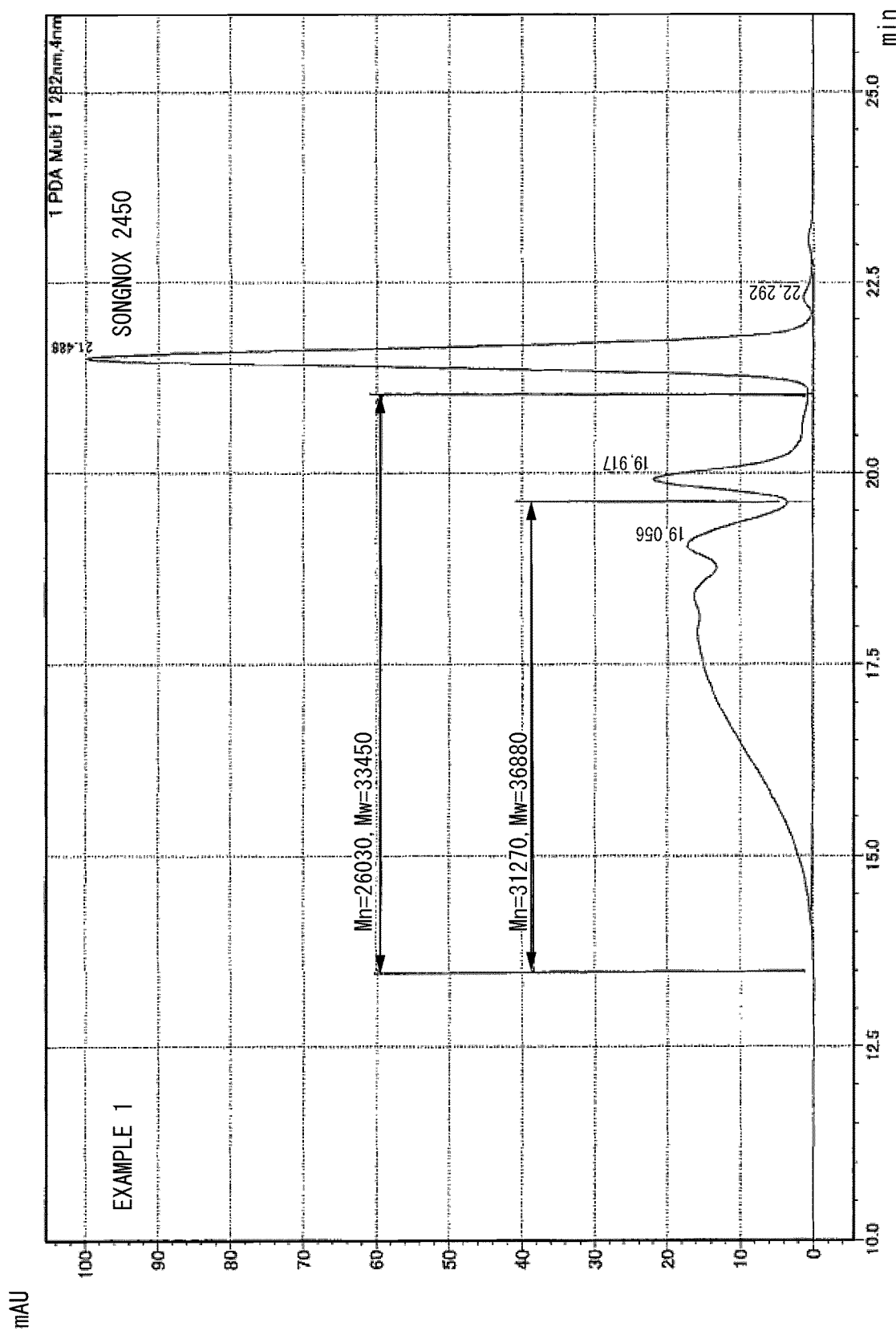
FIG. 5 shows an example of a GPC chromatogram of an antioxidant according to the present invention.

A polyurethane-based hindered phenol antioxidant (AO2-1) was produced in the same manner as that described in Example 1, with the exception that a solution obtained by dissolving 177 g of triethylene glycol bis-3-(3-tert-butyl-4-hydroxy-5-methylphenyl) propionate (product name: Songnox 2450 (in the aforementioned formula (5) wherein k=2), manufactured by Sonwon Industrial Co., Ltd.) in place of 1,3,5-tris (4-tert-butyl-3-hydroxy-2,6-dimethylbenzyl) isocyanuric acid (product name: Songnox 1790, manufactured by Sonwon Industrial Co., Ltd.) in 466 g of dimethylacetamide (DMAc) so as to obtain a DMAc solution having a concentration of the total solid content of 50% by weight was added to the urethane prepolymer (PUPP) which was cooled to room temperature. This solution was heated at elevated temperature in the same manner as that described in Example 1 to confirm the disappearance of the isocyanate group by IR and subsequently cooled to room temperature. The weight-average molecular weight (Mw) of the polyurethane compound portion excluding Songnox 2450 portion was 33,450, and the number-average molecular weight (Mn) thereof was 26,030. In addition, the weight-average molecular weight (Mw) of the polyurethane compound portion corresponding to the aforementioned formula (1) wherein m≥1 and n≥1 was 36,880, and the number-average molecular weight (Mn) thereof was 31,270. FIG. 5 shows the GPC chromatogram showing the evaluation part to clarify the average molecular weight.

Example 3 and Comparative Example 1

The urethane-based phenol antioxidant according to Example 2 was separated using a preparative HPLC (LaboACE LC-5060 manufactured by Japan Analytical Industry Co., Ltd.) to obtain a high-molecular component having the number-average molecular weight calculated in terms of polystyrene of 31,270, a low-molecular component having RT=19.917 (min), and a component of Songnox 2450 as a raw material of RT=21.418 (min).

The high-molecular component is a polyurethane-based hindered phenol antioxidant (AO2-2) containing a constituent unit of polytetramethylene glycol (that is, a polyurethane compound component in the aforementioned formula (1) wherein m≥1, n≥1, and k=2) (Example 3).

The low-molecular component is a compound (AO2-3) obtained by reacting two molecules of triethylene glycol bis-3-(3-tert-butyl-4-hydroxy-5-methylphenyl) propionate with respect to one molecule of diphenylmethane diisocyanate (that is, the compound of the aforementioned formula (1) wherein m=0, n=1, and k=2, molecular weight=1,423.5) (Comparative Example 1).

In the column of the number-average molecular weight in Table 2, the value of this molecular weight is indicated. The amount of the OH group (A) and the amount of the OH group (B) are shown as 1.40 (2/1,423.5).

Table 2 shows the number-average molecular weight, the amount of the OH group (A), the amount of the OH group (B), and the amount of the OH group (C).

The amount of the OH group (A) of the polyurethane-based hindered phenol antioxidant (AO2-2) containing the polytetramethylene glycol of Example 3 was obtained by calculating from the amount of the OH group (A) in Example 2, the amount of the OH group (A) in Comparative Example 1, and the amount of the OH group of triethylene glycol bis-3-(3-tert-butyl-4-hydroxy-5-methylphenyl) propionate of the raw material, as well as, the area ratio of (AO2-2) and (AO2-3) obtained from the GPC chromatogram of FIG. 5.

The amount of the OH group (B) and the amount of the OH group (C) in Example 3 are shown as the same values as the amount of the OH group (A).

Examples 4 to 11

Polyurethane-based hindered phenol antioxidants (AO-3 to AO-10) were prepared in the same manner as that described in Example 1, using the combinations of the diol, and the diisocyanate and the phenol compound (hindered phenol antioxidant) shown in Table 1. Abbreviations in Table 1 are shown in Table 3. The number-average molecular weight and the amount of the OH group are shown in Table 2.

TABLE 1

| | Terminal phenol-containing polyurethane compound | Diol (A) | Isocyanate (B) | Molar ratio (B)/(A) | PUPP reaction temperature | PUPP synthesis period | Phenol compound (C) | Molar ratio (C)/[(B) − (A)] | Catalyst | Temperature | Synthesis period |
|---|---|---|---|---|---|---|---|---|---|---|---|
| Example 1 | AO-1 | PTMG | MDI | 1.8 | 70° C. | 3 hours | Songnox 1790 | 3.0 | None | 70° C. | 2 hours |
| Example 2 | AO2-1 | PTMG | MDI | 1.8 | 70° C. | 3 hours | Songnox 2450 | 3.0 | None | 70° C. | 2 hours |
| Example 3 | AO2-2 | PTMG | MDI | 1.8 | 70° C. | 3 hours | Songnox 2450 | 3.0 | None | 70° C. | 2 hours |
| Comparative Example 1 | AO2-3 | PTMG | MDI | 1.8 | 70° C. | 3 hours | Songnox 2450 | 3.0 | None | 70° C. | 2 hours |
| Example 4 | AO-3 | PTMG | MDI | 1.8 | 70° C. | 3 hours | IONOL LC | 3.0 | None | 70° C. | 2 hours |
| Example 5 | AO-4 | PTMG | MDI | 1.8 | 70° C. | 3 hours | AO-80 | 3.0 | None | 70° C. | 2 hours |
| Example 6 | AO-5 | PTMG | TDI | 1.8 | 70° C. | 3 hours | Songnox 1790 | 3.0 | None | 70° C. | 2 hours |
| Example 7 | AO-6 | PTMG | TDI | 1.8 | 70° C. | 3 hours | Songnox 2450 | 3.0 | None | 70° C. | 2 hours |
| Example 8 | AO-7 | PTMG | PhDI | 1.8 | 70° C. | 3 hours | Songnox 2450 | 3.0 | None | 70° C. | 2 hours |
| Example 9 | AO-8 | PTMG | NaDI | 1.8 | 70° C. | 3 hours | Songnox 2450 | 3.0 | None | 70° C. | 2 hours |
| Example 10 | AO-9 | PTMG | MDI | 1.8 | 70° C. | 3 hours | Songnox 4425 | 3.0 | None | 70° C. | 2 hours |
| Example 11 | AO-10 | PTXG | MDI | 1.8 | 70° C. | 3 hours | Songnox 1790 | 3.0 | None | 70° C. | 2 hours |
| Comparative Example 3 (Note 1) | | — | IPDI | — | — | — | Songnox 1790 | 1.0 | None | 70° C. | 20 hours |
| Comparative Example 4 (Note 2) | | — | IPDI | — | — | — | Songnox 1790 | 1.0 | Present | 70° C. | 2 hours |
| Comparative Example 5 (Note 3) | | — | IPDI | — | — | — | Songnox 1790 | 1.0 | Present | 70° C. | 8 hours |
| Comparative Example 6 (Note 4) | | 1,4-BD | Hydrogenated MDI | 2.0 | 70° C. | 3 hours | Songnox 1790 | 1.0 | Present | 80° C. | 8 hours |

(Note 1) Isocyanate was hardly reacted (isocyanate consumption index = 13%), and for this reason, evaluation of yarns was not carried out.
(Note 2) Isocyanate was hardly reacted (isocyanate consumption index = 28%), and for this reason, evaluation of yarns was not carried out.
(Note 3) Compound according to the Preparation Example of Japanese Examined Patent Application, Second Publication No. Sho 62-43480.
(Note 4) Compound according to Example 5 of Japanese Examined Patent Application, Second Publication No. Sho 62-43480.

TABLE 2

| | Terminal phenol-containing polyurethane compound | Number-average molecular weight/1000 | Amount of OH group (A)/$10^{-3}$ (mol/g) | Amount of OH group (B)/$10^{-3}$ (mol/g) | Amount of OH group (B)/Amount of OH group (A) | Amount of OH group (C)/$10^{-3}$ (mol/g) | Amount of OH group (C)/Amount of OH group (A) |
|---|---|---|---|---|---|---|---|
| Example 1 | AO-1 | 42.88 | 1.42 | 1.18 | 0.83 | 1.11 | 0.78 |
| Example 2 | AO2-1 | 26.03 | 0.86 | 0.69 | 0.80 | 0.53 | 0.61 |
| Example 3 | AO2-2 | 31.27 | 0.53 | 0.53 | 1.00 | 0.53 | 1.00 |
| Comparative Example 1 | AO2-3 | 1.42 | 1.40 | 1.40 | 1.00 | 0.00 | 0.00 |
| Example 4 | AO-3 | 35.18 | 1.49 | 1.24 | 0.83 | 0.95 | 0.64 |
| Example 5 | AO-4 | 40.18 | 0.79 | 0.63 | 0.80 | 0.48 | 0.62 |
| Example 6 | AO-5 | 43.33 | 1.46 | 1.21 | 0.83 | 1.13 | 0.78 |
| Example 7 | AO-6 | 12.28 | 0.90 | 0.72 | 0.80 | 0.55 | 0.62 |
| Example 8 | AO-7 | 19.05 | 0.90 | 0.72 | 0.80 | 0.54 | 0.60 |
| Example 9 | AO-8 | 14.15 | 0.88 | 0.71 | 0.80 | 0.55 | 0.62 |
| Example 10 | AO-9 | 13.55 | 1.00 | 0.80 | 0.80 | 0.61 | 0.62 |
| Example 11 | AO-10 | 40.34 | 1.41 | 1.17 | 0.83 | 1.10 | 0.78 |
| Comparative Example 3 (Note 1) | — | — | — | — | — | — | — |
| Comparative Example 4 (Note 2) | | — | | | | | |
| Comparative Example 5 (Note 3) | | 8.00 | 1.08 | 1.08 | 1.00 | 0.00 | 0.00 |
| Comparative Example 6 (Note 4) | | 10.00 | 0.74 | 0.74 | 1.00 | 0.00 | 0.00 |

TABLE 3

| | Abbreviation | Chemical structural formula name |
|---|---|---|
| Diisocyanate | MDI | 4,4'-Diphenylmethane diisocyanate |
| | TDI | Tolylene diisocyanate |
| | PhDI | p-Phenylene diisocyanate |
| | NaDI | 1,5-Naphthalene diisocyanate |
| | Hydrogenated MDI | Methylene bis(4-cyclohexylisocyanate) |
| | IPDI | Isophorone diisocyanate |
| Diol | PTMG | Polytetramethylene glycol |
| | PTXG | Copolymer of tetrahydrofuran and neopentyl glycol (NPG) (Copolymerization index of NPG = 10% by mol, number-average molecular weight (Mn): 1850) |
| | 1,4-BD | 1,4-Butane diol |
| Antioxidant | Songnox 1790 | 1,3,5-Tris (3-hydroxy-2,6-dimethyl-4-t-butylbenzyl) isocyanuric acid (product name: Songnox 1790 (Sonwon Industrial Co., Ltd.)) |
| | Songnox 2450 | Triethylene glycol bis-3-(t-butyl-4-hydroxy-5-methylphenyl) propionate (product name: Songnox 2450 (Sonwon Industrial Co., Ltd.)) |
| | IONOL LC | Copolymer of paracresol and dicyclopentadiene (product name: IONOL (registered tradename) LC (Raschig GmbH) |
| | AO-80 | 3,9-Bis{2-[3-(3-t-butyl-4-hydroxy-5-methylphenyl) propionyloxy]-1,1-dimethylethyl}-2,4,8,10-tetraoxaspiro [5.5] undecene (product name: ADK STAB (registered tradename) AO-80 (ADEKA Corporation)) |
| | Songnox 4425 | 4,4'-Butylidenebis (6-tert-butyl-3-methylphenol) (product name: Songnox 4425 (Songwon Industrial Co., Ltd.)) |

[Production of Polyurethane Urea Spinning Dope]

400 g of polytetramethylene ether diol having a number-average molecular weight of 1,800 and 91.7 g of 4,4'-diphenylmethane diisocyanate were reacted for 3 hours at 80° C. under a dry nitrogen atmosphere while stirring. Thereby, a urethane prepolymer having isocyanate groups at both the terminals was obtained.

The urethane prepolymer was cooled to room temperature, and subsequently dissolved by adding 720 g of DMAc to prepare a urethane prepolymer solution. On the other hand, 8.11 g of ethylenediamine and 1.37 g of diethylamine were dissolved in 390 g of DMAc, and the solution was added to the urethane prepolymer solution mentioned above under vigorous stirring at room temperature. Thereby, a polyurethane urea spinning dope (A) having a viscosity of 360 Pa·s (30° C.) (concentration: 31.1% by weight) was obtained.

[Preparation Example of Polyurethane Elastic Fibers]

Example 12

A spinning dope obtained by uniformly stirring and mixing 3.0 parts by weight of the solid content of the polyurethane-based hindered phenol antioxidant (AO-1) synthesized in Example 1 with respect to 100 parts by weight of the solid content of the polyurethane urea spinning dope (A) mentioned above was defoamed. Subsequently, the spinning dope was extruded from fine pores of 16 spinnerets (each spinneret having 4 fine pores) to hot air at about 230° C. to evaporate the DMAc solvent. The dried yarn was false-twisted, and passed through a godet roller, and then an oil agent containing dimethylsilicone as a main component was applied thereto on an oiling roller. The yarn was wound around a paper tube at a speed of 700 m/min, and thereby, polyurethane elastic fibers of 44 dt/4 filaments were obtained.

Results of various evaluations using the obtained polyurethane elastic fibers are shown in Table 4. Each of the various evaluation methods is described below.

[Evaluation of Spinning Stability]

The spinning dope produced according to the method described in the Example was spun for 30 hours by the method mentioned above and the number of yarn breakage (times/hour) was measured. The productivity is more stable as the yarn breakage count is smaller.

[Scum Evaluation Method]

The elastic fiber of 44 denier/4 filaments was allowed to stand under an atmosphere of 45° C. and 65% RH for 30 days. A paper tube was placed on a matte roller and while rotating the roller, the elastic fiber was sent out at 40 m/min of a speed of the roller surface. The delivered elastic fiber was wound on a matte roller having the same diameter as described above, which was set at a distance of 50 cm. A razor blade was set at an intermediate point of 25 cm from the elastic yarn sent out so as to have a yarn angle of 115 degrees, and the surface speed on the roller for winding up was set at 70 m/min. After the elastic fiber was allowed to run on the razor blade for 1 hour, the amount of white scum adhered to the razor blade (NT-L type blade, product number L-300, manufactured by NT Incorporated) was visually observed and judged as grade 1 to grade 5.

Grade 5: There is no scum adhesion on the razor blade.

Grade 4: There is only a slight scum adhesion on the razor blade.

Grade 3: There is a scum adhesion on the razor blade.

Grade 2: There is a slightly increased amount of a scum adhesion on the razor blade.

Grade 1: There is a large amount of a scum adhesion on the razor blade.

[Laundry Treatment]

A laundry treatment was carried out in accordance with a method including: boiling the polyurethane fibers of 44 dtex for 1 hour under 50% elongation, subsequently washing for 40 minutes at 40° C. in a laundry liquid in which a surfactant (Attack, manufactured by Kao Corporation) was dissolved at a concentration of 1.3 g/l, subsequently, rinsing with water, and drying for 15 minutes at 50° C.

[Dry Cleaning Treatment]

A dry cleaning treatment was carried out in accordance with a method of immersing the polyurethane fibers of 44 dtex after the laundry treatment mentioned above in Perclene at 50° C. under 50% elongation for 2 hours, and subsequently drying at 50° C. for 15 minutes. The bath ratio in immersing in Perclene was set to 1:1000.

[Yarn Strength of Polyurethane Elastic Fibers]

The polyurethane elastic fibers of 44 dtex thus produced were subjected to the measurement of breakage strength (that is, yarn strength) by using a tensile tester of a measurement method (UTM-3-100 model, manufactured by Orientec Co., Ltd.) at 20° C. and under 65% RH atmosphere, with a sample fiber length of 5 cm and at a strain rate of 1000% for 1 minute. The obtained breakage strength (that is, yarn strength) is shown in Table 4 as "Strength before laundry treatment (cN)".

[Light Resistance Test]

Each of the samples subjected to the laundry treatment and the samples subjected to the laundry treatment and the dry cleaning treatment was independently subjected to a light resistance test, and the strength retention index was evaluated. For the light resistance test, ultraviolet rays were irradiated on polyurethane fibers of 44 dtex for 25 hours by means of a fade meter (manufactured by Suga Test Instruments Co., Ltd.). Thereafter, the breaking strength (that is, yarn strength) was measured under the aforementioned conditions using a tensile tester (UTM-3-100 model, manufactured by Orientec Co., Ltd.). Here, the strength retention index was obtained by the following equation.

Strength retention (%)=Yarn strength after ultraviolet irradiation/Yarn strength before ultraviolet irradiation×100

[Degree of Coloration]

For the samples subjected to the laundry treatment and the dry cleaning treatment, combustion gas tests were carried out and the degree of coloration was evaluated. The combustion gas test was carried out according to AATCC-23 for polyurethane fibers of 44 dtex. The degree of discoloration after exposure to combustion gas was visually judged in 5 ranks of grade 1 . . . yellowish brown, grade 2 . . . yellow, grade 3 . . . light yellow, grade 4 . . . slightly yellow, and grade 5 . . . colorless. However, when the hue is in the middle of each grade, it was indicated by subtracting 0.5 grade from the upper grade.

[Period of Sample Being Cut by Heat (Seconds)]

The sample was pressed against a heat body at 190° C. under 50% elongation, and subsequently, the period of time until the sample was cut was measured.

Example 13

Polyurethane elastic fibers were produced in the same manner as that described in Example 12 by using the polyurethane hindered phenol antioxidant (AO2-1) produced in Example 2.

Example 14

Polyurethane elastic fibers were produced in the same manner as that described in Example 12 by using the polyurethane hindered phenol antioxidant having the high molecular component (AO2-2) separated in Example 3.

Comparative Example 2

Polyurethane elastic fibers were produced in the same manner as that described in Example 12 using the polyurethane hindered phenol antioxidant of the low molecular component (AO2-3) separated in Example 3 and Comparative Example 1.

Examples 15 to 22

Polyurethane elastic fibers were produced in the same manner as that described in Example 1 using the polyurethane hindered phenol antioxidants prepared in Examples 4 to 11.

Comparative Example 3

500 g of DMAc was added to 380 g of 1,3,5-tris (4-tert-butyl-3-hydroxy-2,6-dimethylbenzyl) isocyanuric acid (product name: Songnox 1790) and stirred for 1 hour at 40° C. to dissolve. Subsequently, 120 g of isophorone diisocyanate was added thereto and reacted for 20 hours at 70° C. As a result of measurement of the IR spectrum after 20 hours and confirmation of the consumption rate of isocyanate, the consumption rate was 13% and they were hardly reacted. For this reason, the evaluation of spinning was not carried out.

Comparative Example 4

When isophorone diisocyanate was added in the same manner as that described in Comparative Example 3, 0.1 g of di-n-butyltin dilaurate as a catalyst was added and reacted for 2 hours at 70° C. As a result of measurement of the IR spectrum after 2 hours and confirmation of the consumption rate of isocyanate, the consumption rate was 28% and they were hardly reacted. For this reason, the evaluation of spinning was not carried out.

Comparative Example 5

A reaction product between 100 parts by weight of 1,3,5-tris (4-tert-butyl-3-hydroxy-2,6-dimethylbenzyl) isocyanuric acid (product name: Songnox 1790) and 31.76 parts by weight of isophorone diisocyanate was synthesized with reference to the method described in the Preparation Example of Japanese Examined Patent Application, Second Publication No. Sho 62-43480. Polyurethane elastic fibers were produced in the same manner as that described in Example 12 using the reaction product mentioned above.

Comparative Example 6

A reaction product of 1,4-butanediol, methylenebis (4-cyclohexylisocyanate), and 1,3,5-tris (4-tert-butyl-3-hydroxy-2,6-dimethylbenzyl) isocyanuric acid (product name: Songnox 1790) was synthesized with reference to the method described in Example 5 of Japanese Examined Patent Application, Second Publication No. Sho 62-43480. Polyurethane elastic fibers were produced in the same manner as that described in Example 12 using the reaction product mentioned above.

Comparative Example 7

Polyurethane elastic fibers were produced in the same manner as that described in Example 12, with the exception that only the polyurethane urea spinning dope mentioned above was used.

Comparative Example 8

In accordance with the method described in column 6 on page 3 of Japanese Examined Patent Application, Second Publication No. Hei 05-24246, 1.1 mol of p-cresol was added to 1 mol of dicyclopentadiene, and $BF_3(CH_2CH_5)_2O$ was added in an amount of 3% parts by weight with respect to the concentration of the solid contents of both compounds mentioned above. They were reacted at 90° C. Thereafter, the reaction mixture was diluted with a toluene solvent to a 30% solution, and was reacted by bubbling an isobutylene gas at 50° C. The toluene was removed by distillation. Thereby, a solid product of a p-cresol/divinylbenzene/isobutylene reaction product having a number-average molecular weight (Mn) of 2,450 was obtained. This reaction product was added in an amount of 3% by weight based on the solid product of the polyurethane polymer, and polyurethane elastic fibers were produced in the same manner as that described in Example 12.

Comparative Example 9

1,3,5-tris (4-tert-butyl-3-hydroxy-2,6-dimethylbenzyl) isocyanuric acid (product name: Songnox 1790) was added in an amount of 3% by weight with respect to the solid content of the aforementioned polyurethane urea spinning dope, and was dissolved therein. Polyurethane elastic fibers were produced in the same manner as that described in Example 12.

TABLE 4

| | Polyurethane-based phenol compound of Table 1 | Addition amount (Note 1) | Spinning stability (times/hr) | Scum evaluation (grade) | Strength before laundry treatment (cN) |
|---|---|---|---|---|---|
| Example 12 | AO-1 (Example 1) | 3 | 0.12 | 5 | 59 |
| Example 13 | AO2-1 (Example 2) | 3 | 0.11 | 5 | 62 |
| Example 14 | AO2-2 (Example 3) | 3 | 0.11 | 5 | 50 |
| Comparative Example 2 | AO2-3 (Low molecular component) | 3 | 0.15 | 3 | 58 |
| Example 15 | AO-3 (Example 4) | 3 | 0.14 | 4 | 61 |
| Example 16 | AO-4 (Example 5) | 3 | 0.12 | 5 | 67 |
| Example 17 | AO-5 (Example 6) | 3 | 0.15 | 4 | 64 |
| Example 18 | AO-6 (Example 7) | 3 | 0.13 | 4 | 60 |
| Example 19 | AO-7 (Example 8) | 3 | 0.17 | 4 | 61 |
| Example 20 | AO-8 (Example 9) | 3 | 0.16 | 4 | 56 |
| Example 21 | AO-9 (Example 10) | 3 | 0.19 | 4 | 53 |
| Example 22 | AO-10 (Example 11) | 3 | 0.12 | 5 | 58 |
| Comparative Example 5 | (Note 2) | 3 | 0.35 | 3 | 61 |
| Comparative Example 6 | (Note 3) | 3 | 0.41 | 3 | 63 |
| Comparative Example 7 | None added | — | 30.05 | 5 | 48 |
| Comparative Example 8 | (Note 4) | 3 | 0.24 | 4 | 55 |
| Comparative Example 9 | Songnox 1790 | 3 | 0.26 | 4 | 52 |

TABLE 4-continued

|  | After laundry treatment | | | After laundry treatment/dry cleaning treatment | | |
| --- | --- | --- | --- | --- | --- | --- |
|  | Strength retention index after light resistance test (%) | Degree of coloration (grade) | Period until sample was cut by heat (seconds) | Strength retention index after light resistance test (%) | Degree of coloration (grade) | Period until sample was cut by heat (190° C.) (seconds) |
| Example 12 | 80 | 4.5 | 114 | 70 | 4.5 | 110 |
| Example 13 | 67 | 4.5 | 115 | 65 | 4.5 | 110 |
| Example 14 | 72 | 4.5 | 115 | 73 | 4.5 | 117 |
| Comparative Example 2 | 78 | 4 | 98 | 11 | 3 | 59 |
| Example 15 | 66 | 4.5 | 101 | 54 | 4.5 | 97 |
| Example 16 | 65 | 4.5 | 106 | 57 | 4.5 | 97 |
| Example 17 | 65 | 4.5 | 99 | 51 | 4.5 | 91 |
| Example 18 | 61 | 4.5 | 101 | 52 | 4.5 | 95 |
| Example 19 | 58 | 4.5 | 90 | 49 | 4.5 | 81 |
| Example 20 | 59 | 4.5 | 80 | 48 | 4.5 | 105 |
| Example 21 | 61 | 5 | 83 | 50 | 4.5 | 88 |
| Example 22 | 73 | 4.5 | 113 | 65 | 4.5 | 106 |
| Comparative Example 5 | 62 | 4 | 78 | 31 | 3 | 58 |
| Comparative Example 6 | 64 | 4.5 | 80 | 29 | 3 | 63 |
| Comparative Example 7 | 0 | 1.5 | 15 | 0 | 1.5 | 12 |
| Comparative Example 8 | 61 | 4 | 94 | 25 | 3 | 65 |
| Comparative Example 9 | 60 | 4 | 91 | 0 | 2 | 35 |

(Note 1) % by weight with respect to the solid content of the polyurethane polymer
(Note 2) Compound according to Preparation Example of Japanese Examined Patent Application, Second Publication No. Sho 62-43480
(Note 3) Compound according to Example 5 of Japanese Examined Patent Application, Second Publication No. Sho 62-43480
(Note 4) Compound A-2 of Japanese Examined Patent Application, Second Publication No. Hei 5-24246

It was confirmed that the polyurethane elastic fibers of the present invention exhibited superior spinning stability, a reduced occurrence of scum, superior retention of strength after the light resistance test, even via the laundry treatment or the dry cleaning treatment, a reduction of coloration due to combustion gas, and a reduction of yarn breakage due to heat.

INDUSTRIAL APPLICABILITY

The antioxidant of the present invention can be suitably used as a stabilizer for polyurethane elastic fibers. In addition, the polyurethane elastic fibers of the present invention can be suitably used in inner-wear, outer-wear, leggings, sportswear, jeans, swimsuits, or rubber yarn products for diapers. In addition, the polyurethane compound contained in the antioxidant of the present invention has a functional group of a phenolic antioxidant at the terminal of the polymer chain, and for this reason, application thereof to a stabilizer for various types of high-molecular polymers other than polyurethane such as polyamide, polyester, and the like can also be expected.

What is claimed is:

1. A method for producing an antioxidant comprising a polyurethane compound represented by the following formula (1):

(1)

wherein $Y^1$ is a residue of a diol, and each $Y^1$ may be the same or different, $R^1$ is a residue of an aromatic diisocyanate, and each $R^1$ may be the same or different, $X^1$ is a residue of a hindered phenol compound having at least k hindered phenolic hydroxyl groups, and each $X^1$ may be the same or different, m is an integer of 1 or more, n is an integer of 1 or more, and k is an integer of 2 or more, said method comprising:

reacting one or more diol compounds comprising the $Y^1$ moieties found in formula (1) with one or more aromatic diisocyanate compounds comprising the $R^1$ moieties found in formula (1) in an excess molar amount ranging from 1.01 to 2.1 times with respect to said one or more diol compounds to obtain a urethane prepolymer represented by the following formula (4),

(4)

wherein $Y^1$, $R^1$, and m in formula (4) are the same as in formula (1); and reacting an isocyanate group of the urethane prepolymer represented by formula (4) with a phenol group of one or more hindered phenol compounds comprising the $X^1$ moieties found in formula (1) in an excess molar amount with respect to each isocyanate group of said urethane prepolymer to obtain the antioxidant comprising the polyurethane compound.

2. The method for producing an antioxidant according to claim 1, wherein the polyurethane compound represented by said formula (1) has a number-average molecular weight ranging from 8,000 to 100,000.

3. The method for producing an antioxidant according to claim 1, wherein said one or more hindered phenol compounds have a hindered phenol group represented by any one of the following formula (6) to formula (11):

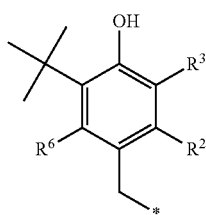
(6)

wherein $R^2$, $R^3$, and $R^6$ in formula (6) are each independently a hydrogen atom or a methyl group, and * represents a binding position,

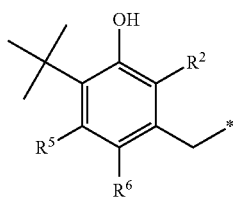
(7)

wherein $R^2$, $R^5$, and $R^6$ in formula (7) are each independently a hydrogen atom or a methyl group, and * represents a binding position,

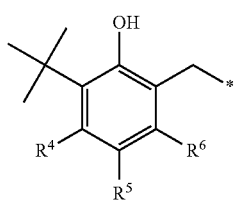
(8)

wherein $R^4$, $R^5$, and $R^6$ in formula (8) are each independently a hydrogen atom or a methyl group, and * represents a binding position,

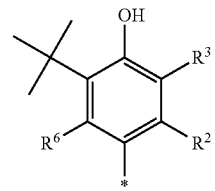
(9)

wherein $R^2$, $R^3$, and $R^6$ in formula (9) are each independently a hydrogen atom or a methyl group, and * represents a binding position,

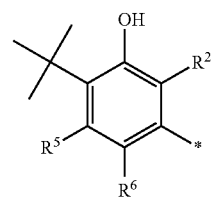
(10)

wherein $R^2$, $R^5$, and $R^6$ in formula (10) are each independently a hydrogen atom or a methyl group, and * represents a binding position, and

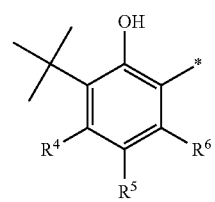
(11)

wherein $R^4$, $R^5$, and $R^6$ in formula (11) are each independently a hydrogen atom or a methyl group, and * represents a binding position.

4. The method for producing an antioxidant according to claim 3, wherein the one or more hindered phenol compounds are selected from the group consisting of 1,3,5-tris (2,6-dimethyl-3-hydroxy- 4-tert-butylbenzyl) isocyanuric acid, triethylene glycol bis-3-(3-tert-butyl-4-hydroxy-5-methylphenyl) propionate, 3,9-bis [2-{3-(3-tert-butyl-4-hydroxy-5-methylphenyl) propionyloxy}-1,1-dimethylethyl]-2,4,8,10-tetraoxaspiro [5.5] undecene, and 4,4'-butylidenebis (6-tert-butyl-3-methylphenol).

5. The method for producing an antioxidant according to claim 1, wherein at least one of said one or more hindered phenol compounds is a polymer having a hindered phenol group represented by the following formula (12) or formula (13)

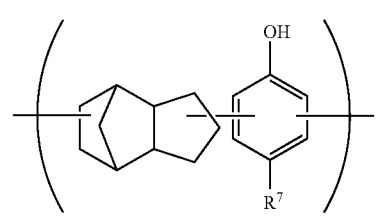
(12)

wherein $R^7$ in formula (12) is an alkyl group having 1 to 4 carbon atoms,

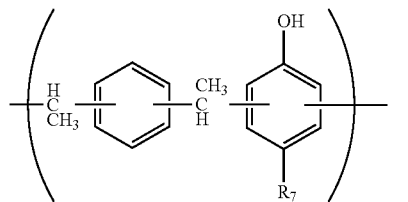

(13)

wherein $R^7$ in formula (13) is an alkyl group having 1 to 4 carbon atoms.

6. The method for producing an antioxidant according to claim 5, wherein said one or more hindered phenol compounds are selected from the group consisting of a para-cresol-dicyclopentadiene copolymer, a divinylbenzene-paracresol copolymer, and a paracresol-dicyclopentadiene-isobutene copolymer.

* * * * *